(12) United States Patent
Brody et al.

(10) Patent No.: US 11,921,705 B2
(45) Date of Patent: *Mar. 5, 2024

(54) INFORMATION STORAGE AND RETRIEVAL USING AN OFF-CHAIN ISOMORPHIC DATABASE AND A DISTRIBUTED LEDGER

(71) Applicants: Ernst & Young U.S. LLP, New York, NY (US); EYGS LLP, London (GB)

(72) Inventors: Paul Richard Brody, Woodside, CA (US); Duncan James Westland, Addlestone (GB); Chaitanya Reddy Konda, London (GB)

(73) Assignees: Ernst & Young U.S. LLP, New York, NY (US); EYGS LLP, London (GB)

( * ) Notice: Subject to any disclaimer, the term of this patent is extended or adjusted under 35 U.S.C. 154(b) by 135 days.

This patent is subject to a terminal disclaimer.

(21) Appl. No.: 17/566,954

(22) Filed: Dec. 31, 2021

(65) Prior Publication Data

US 2022/0197894 A1 Jun. 23, 2022

Related U.S. Application Data

(63) Continuation of application No. 17/216,083, filed on Mar. 29, 2021, now Pat. No. 11,216,448, which is a
(Continued)

(51) Int. Cl.
*H04L 29/06* (2006.01)
*G06F 16/23* (2019.01)
(Continued)

(52) U.S. Cl.
CPC ....... *G06F 16/2379* (2019.01); *G06Q 20/389* (2013.01); *H04L 9/088* (2013.01);
(Continued)

(58) Field of Classification Search
CPC ..... H04L 9/088; H04L 9/3239; H04L 63/123; H04L 9/0637; H04L 2209/38; G06F 16/2379
(Continued)

(56) References Cited

U.S. PATENT DOCUMENTS 10,062,049 B2 8/2018 Pizzuto
10,740,844 B2 * 8/2020 Stradling .............. H04L 63/105
(Continued)

FOREIGN PATENT DOCUMENTS

WO WO-2020023648 A1 1/2020

OTHER PUBLICATIONS

Benet, J., "IPFS—Content addressed, versioned, P2P file system (Draft 3)," Jul. 14, 2014, Retrieved from the Internet: URL: https://arxiv.org/pdf/1407.3561.pdf, Retrieved from the Internet on: May 23, 2019, 11 pages.
(Continued)

*Primary Examiner* — Longbit Chai
(74) *Attorney, Agent, or Firm* — COOLEY LLP (57) ABSTRACT

A processor-implemented method for the ownership transfer and tracking of tangible assets using a blockchain is described. In an embodiment, the method includes generating a root node associated with a tangible asset via a processor. The root node has a first hash value that represents a storage location of the root node, data associated with a tangible asset, and a second hash value that represents a storage location of the subsidiary node. The method also includes storing a hierarchical hash-linked tree structure in a non-transitory, processor-readable memory. The hierarchical hash-linked tree structure can include multiple nodes. The multiple nodes include the root node and the subsidiary
(Continued)

node. The subsidiary node has the second hash value, and data associated with a tangible sub-asset of the tangible asset.

20 Claims, 6 Drawing Sheets

Related U.S. Application Data continuation-in-part of application No. 16/044,341, filed on Jul. 24, 2018, now abandoned.

(51) Int. Cl.
*G06Q 20/38* (2012.01)
*H04L 9/08* (2006.01)
*H04L 9/32* (2006.01)
*H04L 9/00* (2022.01)

(52) U.S. Cl.
CPC ....... *H04L 9/3239* (2013.01); *G06Q 2220/00* (2013.01); *H04L 9/50* (2022.05)

(58) Field of Classification Search
USPC .......................................................... 726/1
See application file for complete search history.

(56) References Cited

U.S. PATENT DOCUMENTS

| | | |
|---|---|---|
| 11,216,448 B2 | 1/2022 | Brody et al. |
| 2006/0031246 A1 | 2/2006 | Grayson |
| 2008/0247674 A1* | 10/2008 | Walch .................... G06F 18/28 382/305 |
| 2010/0205256 A1 | 8/2010 | Nguyen et al. |
| 2013/0198838 A1 | 8/2013 | Schmidt et al. |
| 2018/0012311 A1 | 1/2018 | Small et al. |
| 2018/0039667 A1* | 2/2018 | Pierce ................... H04L 9/3247 |
| 2018/0096175 A1 | 4/2018 | Schmeling et al. |
| 2018/0322587 A1 | 11/2018 | Linne |
| 2020/0034457 A1* | 1/2020 | Brody ................... H04L 9/0819 |
| 2021/0326815 A1 | 10/2021 | Brody et al. |

OTHER PUBLICATIONS

International Search Report and Written Opinion for International Application No. PCT/US2019/043259, dated Oct. 2, 2019, 12 pages.

Kasireddy, P., "How does Ethereum work, anyway?" Sep. 28, 2017, Retrieved from the Internet: URL: http://web.archive.org/web/20170928001233/https://medium.com/@preethikasireddy/how-does-ethereum-work-anyway-22d1df506369, Retrieved from the Internet on: Sep. 23, 2019, 41 pages.

Office Action for U.S. Appl. No. 16/044,341, dated Apr. 17, 2019, 18 pages.

Office Action for U.S. Appl. No. 16/044,341, dated Oct. 3, 2019, 24 pages.

Office Action for U.S. Appl. No. 17/216,083, dated Jun. 30, 2021, 9 pages.

Raval, S., "Decentralized Applications: Harnessing Bitcoin's Blockchain Technology," Aug. 8, 2016, O'Reilly, 118 pages.

* cited by examiner

INFORMATION STORAGE AND RETRIEVAL USING AN OFF-CHAIN ISOMORPHIC DATABASE AND A DISTRIBUTED LEDGER

CROSS-REFERENCE TO RELATED APPLICATIONS

This application is a Continuation of U.S. patent application Ser. No. 17/216,083, filed Mar. 29, 2021, now U.S. Pat. No. 11,216,448, and titled "Information Storage and Retrieval Using an Off-Chain Isomorphic Database and a Distributed Ledger," which is a continuation-in-part of U.S. patent application Ser. No. 16/044,341, filed Jul. 24, 2018 and titled "System and Methods For Organizing And Inter-Relating Hierarchical Data Files Using a Distributed Database," the entire contents of each of which are incorporated herein by reference in their entireties.

TECHNICAL FIELD

This application relates to methods for organizing and managing database information to provide access to, and facilitate the retrieval of, inter-related hierarchical data records and files.

BACKGROUND

A blockchain is a secure, modification-resistant chain of sequential, verifiable records (or "blocks") typically representing transactions between parties. A blockchain is typically stored in a distributed manner, for example as a distributed digital ledger, and communicatively coupled to a network. Some known blockchain-based applications combine blockchain resources with off-chain storage such as databases or dedicated file systems.

SUMMARY

A method for information storage and retrieval using an off-chain isomorphic database and a distributed ledger includes storing, in the off-chain isomorphic database, a first hierarchical hash-linked tree data structure. The first hierarchical hash-linked tree data structure represents tangible asset data of a first tangible asset, and the off-chain isomorphic database does not include any block of the distributed ledger. The method further includes causing storage, in the distributed ledger, of a first hash value representing a first storage location of the off-chain isomorphic database in which a root node of the first hierarchical hash-linked tree data structure is stored, the first hash value associated with a state of a smart contract. The method further includes modifying the tangible asset data in response to receipt of a private cryptographic key from a user. The method further includes generating a subsidiary node in response to the modification of the tangible asset data, the modification in the tangible asset at least partially associated with a second tangible asset. The method further includes modifying the first hierarchical hash-linked tree data structure to include the subsidiary node, to produce a second hierarchical hash-linked tree data structure. The method further includes storing, in the off-chain isomorphic database and at a second storage location, the second hierarchical hash-linked tree data structure, and causing storage, in the distributed ledger, of a second hash value representing the second storage location.

DETAILED DESCRIPTION

Some existing blockchain technologies track the transfer of cryptocurrency, measured in units of fluctuating and/or fungible value, from one person to another. Cryptocurrencies (e.g., bitcoin, ether, etc.) typically have no data associated with them, apart from their notional value. Other blockchain technologies manage the notarization of events related to an asset (e.g., the buying or selling of a car or other asset) on a blockchain. By contrast, according to embodiments of the present disclosure, blockchain-based methods and systems are disclosed for generating, transferring and tracking "asset tokens" that represent "complex" tangible/physical assets. Assets represented by asset tokens can be non-fungible/unique (e.g., a parcel of land or a machine such as an automobile, an aircraft, a computing device, etc.) or fungible (e.g., a liter of 99% ethanol). In some embodiments, a single asset token "maps to" (i.e., represents an identifier of a storage location in) a plurality of data records in a tokenization system. The tokenization system can include a processor in operable communication with a memory storing the plurality of data records.

An "asset token" is a digital token (i.e., a digital identifier including a bit sequence) that maps to one or more data records stored in an asset tokenization system, where the data records represent information about parts of a complex asset (e.g., parts of a tangible or physical asset such as a car or other manufactured machine or item, a parcel of land, etc.). As a used herein, a "complex" asset is an asset that is produced by assembling multiple tangible parts and/or by performing multiple production or assembly steps before reaching its final (e.g., fully manufactured) form. The complex physical assets represented by associated asset tokens can be referred to as "underlying assets." An asset token can also be referred to as a "smart asset token" or a "crypto-asset." Asset token data can be at least partially stored in, at least partially represented in, and/or at least partially transacted on, a blockchain. Additional details about blockchain implementation can be found in "Bitcoin: A Peer-to-Peer Electronic Cash Syste," Satoshi Nakamoto, Jan. 31, 2008, the entire content of which is incorporated by reference herein in its entirety. The asset token can represent (and/or store portions of) hierarchically-structured data, for example in a hash-linked tree structure (e.g., asset token data structure 200 of FIG. 2, discussed below), and the hierarchically-structured data can have a size/volume that is arbitrarily large.

An asset token can be generated (or "minted"), for example, at a time when the associated asset or sub-asset is manufactured or otherwise brought into existence. When a modification is made to an asset (e.g., during a manufacturing process or other supply chain event, such as any event shown in FIG. 1), the associated asset token can be regenerated so as to include the modification (i.e., so as to represent the asset in its changed form), and the previous instance of the asset token can be destroyed (or "burned"). An asset token or sub-asset token can be destroyed, for example, by adding an indication to the asset token or sub-asset token that the asset token or sub-asset token can no longer be transacted/used. When an asset token or a sub-asset token is destroyed, the destruction even can be recorded in the blockchain. An asset token can be moved from one virtual location to another virtual location, e.g., via smart contracts and/or by transfers of ownership of the asset tokens (and, correspondingly, of their underlying assets). An asset token can also be destroyed ("burned") when the associated tangible/physical asset is destroyed, lost, rendered inaccessible, stolen, or disassembled. A smart contract, as used herein, is a computerized transaction protocol that executes the terms of a contract, and can store an address (e.g., a unique identifier), a balance (e.g., of Ether), a state, and code (e.g., compiled byte-code that blockchain clients and nodes can run/execute, for example by calling the code). Stated another way, a smart contract is a self-executing contract with the terms of the contract directly written into lines of code. A "state" of a smart contract is the current state or value of all fields and variables declared in the smart contract. Stated another way, the "state" of a smart contract is a snapshot of the data stored in the smart contract. As discussed herein, the data stored in the smart contract can include the hash value of a root node of a hierarchical, hash-linked data structure associated with a tangible asset (and, optionally, composite sub-assets of the tangible asset).

A person/entity may be said to "own" an asset when they are in possession of a private key associated with the asset token. Alternatively or in addition, ownership of an asset token can be defined by a location of the asset token (e.g., as represented by a blockchain address). For example, the location can be a smart contract having a blockchain address. A smart contract can be associated with a predetermined geographic location and/or a predetermined entity. Such smart contracts can be referred to as "location smart contracts." A location smart contract can include information/data about one or more assets (i.e., physical complex assets and, optionally, cryptocurrency) that are owned by the predetermined entity referenced in that location smart contract and/or whose ownership is tied to the predetermined geographic location referenced in that location smart contract. The asset information can include descriptors such as physical size, color, quantity, make, model, assay information, etc. A location smart contract can be queried by a computing device of an associated asset token system (e.g., system 300 of FIG. 3, discussed below). In some embodiments, a query includes an indicator of a location smart contract, and a response to the query includes indications of all assets that are owned by the location smart contract. In other embodiments, a query includes an indicator of a specific complex asset or sub-asset (e.g., a root hash), and a response to the query includes an indication of whether the specific complex asset or sub-asset is owned by the location smart contract. Depending upon the implementation, a change of ownership of a complex asset can occur via a modification, within an existing location smart contract, to a record associated with the complex asset, or via a movement of the record associated with the complex asset from the existing location smart contract to a different location smart contract (and, correspondingly, a deletion of the record associated with the complex asset from the existing location smart contract). Information about the change in ownership transaction can be recorded in a block of the associated blockchain via the associated asset token system. In some embodiments, the authorization to manipulate (e.g., modify and/or transfer) a location smart contract is determined by a separate smart contract, for example using a private key associated with the location smart contract.

In some embodiments, data of an asset token represents an asset as it is manufactured, moved through a supply chain, stored, assembled, disassembled, consumed, or any combination of the foregoing. In other words, the asset token can track the journey of a real-world (i.e., tangible) asset that is represented by the asset token on the blockchain. The asset token can be moved from one virtual location to another virtual location, its ownership can be transferred, and its form can be changed.

In some embodiments, a representation of the complex asset (e.g., in the form of a hash value that references an asset token associated with the complex asset) is stored within a blockchain, and the associated asset data defining and/or describing the complex asset (e.g., the asset token itself, for example in the form of a hierarchical hash-linked tree structure), is stored off the blockchain (i.e., "off-chain") in a database of the asset token system. As used herein, "off-chain" refers to a storage location that is not located within a node of a blockchain network (i.e., off-chain data is stored separately from data of the blockchain, for example in memories of different computing devices, optionally separately controlled). Off-chain data is not stored in a block of the blockchain. An "off-chain" storage location, which is not located within a node of a blockchain network and does not include a block of a blockchain, can also be referred to as a "non-blockchain location." The database can be a distributed database, and the blockchain can be separately stored in a distributed manner (e.g., as a distributed ledger). The asset's hash value can include or represent a key for looking up the data defining the complex asset in the off-chain location. As such, changes to the off-chain data indirectly impact the on-chain references thereto. For example, when on-chain data "points to," gives access to, or references a location of, off-chain data, then off-chain data can be changed without a corresponding change to on-chain data. In other embodiments, a subset of the asset data is stored within a blockchain (in addition to an associated hash referencing the remaining asset data), and the remaining data (i.e., the asset data minus the subset thereof) is stored off-chain (e.g., as a second subset of the asset data), for example in a distributed database.

In some embodiments, a status of the asset token can be continuously or intermittently tracked and compared with one or more data values that are based, for example, on signals detected by one or more devices within an Internet of Things ("IoT"). Based on the comparison, a discrepancy can be identified that triggers, for example, a modification of the asset token (e.g., a modification to the off-chain data). This reconciliation of the IoT data with the asset token data can lead to reduced error, costs and/or delays, for example in a supply-chain context.

In some embodiments, a real-world tangible asset can be moved as a result of one or more autonomous smart contracts. For example, a warehouse smart contract can automatically generate or trigger an order for more stock of a product when it is detected that the product quantity is lower than a predetermined threshold. Additionally or alternatively, payments (e.g., invoice payments, tax payments) associated with the tangible asset can be fully automated by one or more smart contracts. In some embodiments, changes to a smart contract are recorded on a blockchain. For example, a hash representing a storage location of a modified smart contract can be stored on the blockchain. Optionally, data associated with the change to the smart contract is stored on the blockchain together with the hash representing the storage location of the modified smart contract. In other embodiments, changes to a smart contract are made off-chain and are not reflected directly on the blockchain. For example, an existing block of the blockchain can include a hash referencing an off-chain storage location of the smart contract, and although the hash may be pointing to modified data after the smart contract is modified, the hash itself (on the blockchain) may remain unchanged.

Differences Between Cryptocurrency Tokens and Asset Tokens

Cryptocurrencies, such as Ethereum or other ERC-20 currency, typically represent a single unit of value (e.g., convertible, fungible). Such currency-based asset tokens do not include data (e.g., apart from an indication of nominal value), but do have owners. The owner of a currency-based asset token can be identified/verified based on his/her possession of or access to an associated private key.

By contrast, asset tokens for complex assets can have a significant quantity/volume of associated data, for example that defines and/or describes the complex asset, and the complex asset can be non-fungible. Asset data can include data representing one or more of: a quantity of the physical asset represented by the asset token, a physical location of the asset location, sub-assets that collectively form the asset (e.g., a quantity of sub-assets of the asset), color of the asset and/or sub-assets thereof, assay information for the asset, location of production, manufacture, packaging, or testing of the asset and/or each sub-asset, etc. In some implementations, quantity data is expressed and/or stored in units that are suitable for division or multiplication (e.g., on an integer basis), such that if the associated data is subdivided into multiple separate data segments for a plurality of assets or sub-assets, the quantity of assets or sub-assets can still be tracked. For example, a sheet of rubber can be divided up into a plurality of portions for use as shoe soles.

Some or all of the asset data can be immutable, e.g., beginning at a time at which they are defined or added to the asset data, or rendered immutable at a time subsequent thereto. Examples of immutable data include make and model of an automobile; tracking information regarding movement of pharmaceutical product (e.g., from raw material form, through manufacture, to point of consumption); historical information about ownership of an asset; historical information about transactions (e.g., payments, such as royalties) associated with the asset; historical information about the distribution of a fund (e.g., a grant), etc. Asset transfers performed according to systems and methods of the present disclosure can generate an immutable record of the transfers.

Some or all of the asset data can be mutable, e.g., beginning at a time at which they are defined or added to the asset data, or rendered mutable at a time subsequent thereto. Examples of mutable data include the type of tires currently affixed to an automobile, a color/type of paint, a configuration, etc.

In some embodiments, the amount/volume of asset data is too large to be stored on a blockchain. For example, an aircraft includes a large number of sub-assets. In other words, each sub-asset of the aircraft can, itself, include an associated multitude of sub-assets (e.g., embedded sub-assets). Methods of the present disclosure facilitate the use of blockchain for tracking and manipulation of complex assets by storing at least a portion of the associated asset data off-chain and not on-chain.

Blockchain records associated with asset tokens can be "immutable," authoritative records, thereby reducing or eliminating the need for auditing of the records.

In some embodiments, ownership of an asset is associated with possession of a cryptographic key, or "private" key. As such, rather than providing the ability to assert ownership of an asset within the blockchain structure, as has previously been done, embodiments of the present disclosure refer to information associated with an "actual" owner of an asset, and that information is included with the asset token (e.g., stored off-chain).

Using Asset Tokens in a Supply Chain Context

FIG. 1 is a flowchart showing associations between real-world supply chain events and asset token-related events of the present disclosure, according to some embodiments. As shown in FIG. 1, an example supply chain process 100A (upper portion of FIG. 1) includes one or more of: manufacturing, at 120, of one or more assets and/or sub-assets; assembly, at 122, of sub-assets into a new, "composite" asset; sale, at 124, of the one or more assets and/or sub-assets; transfer, at 126, of ownership of the one or more assets and/or sub-assets; and destruction, at 128, of the one or more assets and/or sub-assets. Each of the foregoing real-world supply chain events can be associated with an asset token-related activity. For example, in connection with the asset/sub-asset manufacture 120 (or any other means by which a tangible asset is brought into existence), one or more associated asset tokens and/or sub-asset tokens can be generated off-chain, at 121 (e.g., through the definition of a hierarchical data structure, as shown and discussed below with reference to FIG. 2). Also in connection with the asset/sub-asset manufacture 120, optionally, the one or more associated asset tokens and/or sub-asset tokens can be assigned to one or more owner entities (e.g., represented by one or more blockchain addresses) at 123A.

The assignment of ownership of an asset token or a sub-asset token to an owner entity at 123A can be performed off-chain, at least in part, by adding an indicator of an association between an owner blockchain address and the asset token or sub-asset token to a smart contract, or by generating a new smart contract that includes an indicator of an association between an owner blockchain address and the asset token or sub-asset token. The assignment of ownership of an asset token or sub-asset token to an owner entity 123 can occur before, substantially concurrently with, or after the generation of the asset token(s) and/or sub-asset token(s) at 121. For example, the one or more asset token hashes (or one or more sub-asset token hashes) can be assigned to one or more owner entities at 123A in connection with (e.g., substantially concurrently with or after) the assembly of multiple sub-assets into one or more composite assets at 122. Also in connection with the assembly of multiple sub-assets into one or more composite assets at 122, the asset tokens and/or sub-asset tokens associated with the assembled sub-assets can be "merged," at 125, into a composite asset token associated with the one or more composite assets. This "merging" of the asset tokens and/or sub-asset tokens can be performed by generating an altogether new asset token, whose data includes data about each of the sub-assets that have been assembled together, and the original asset tokens and/or sub-asset tokens can be destroyed (e.g., to avoid counting the same assets or sub-assets more than once within the asset token system). For example, a first tangible asset may be associated with a first hierarchical hash-linked tree structure (i.e., a first asset token) and a second tangible asset may be associated with a second hierarchical hash-linked tree structure (i.e., a second asset token). When the first tangible asset and the second tangible asset are merged or combined, a third hierarchical hash-linked tree structure (i.e., a third asset token) may be generated in response to the merging of the first tangible asset with the second tangible asset. The third hierarchical hash-linked tree structure can include the asset data and/or sub-asset data of the first hierarchical hash-linked tree structure and the asset data and/or sub-asset data of the second hierarchical hash-linked tree structure. In such a case, the first tangible asset and the second tangible asset can be referred to as "sub-assets" of the third tangible asset. Once the third asset token is defined, the first asset token and/or the second asset token may be destroyed.

The destroying of the original asset tokens and/or sub-asset tokens can include an off-chain modification to ownership and/or location data associated with the original asset or sub-asset. For example, an ownership identifier within a smart contract associated with the original asset token and/or sub-asset token can be stored in the composite asset token prior to the off-chain data of the original asset token and/or sub-asset token being deleted from memory. Alternatively or in addition, the destroying of the original asset tokens and/or sub-asset tokens can include incorporating/adding the hierarchical data of the original asset or sub-asset tokens into hierarchical data of the composite asset token prior to the off-chain data of the original asset token and/or sub-asset token being deleted from memory. Alternatively or in addition, the destroying of the original asset tokens and/or sub-asset tokens can include adding an identifier to each of the original asset tokens to indicate that those asset tokens (and/or sub-asset tokens) can no longer be transacted on the blockchain. Alternatively or in addition, the destroying of the original asset tokens and/or sub-asset tokens can include deleting the original asset tokens (and/or sub-asset tokens) from memory. The merging and/or destroying of the original asset tokens and/or sub-asset tokens can be recorded on the blockchain. Regardless of whether an assignment of an asset token hash to an owner entity has occurred at 123A, if a sale of the asset(s) and/or sub-asset(s) occurs at 124, the one or more associated asset tokens and/or sub-asset tokens can be assigned to one or more owner entities (e.g., represented by one or more blockchain addresses) at 123B.

In connection with the transfer of ownership of the one or more assets and/or sub-assets at 126, the associated hashes of the one or more asset tokens and/or sub-asset tokens can be transferred to another entity at 127. In connection with the destruction, disassembly, decommissioning, or disposal of the physical one or more assets and/or sub-assets at 128, the associated one or more asset tokens and/or sub-asset tokens can be destroyed (or "burned") at 129. An asset token or sub-asset token can be destroyed, for example, by adding an indication to the asset token or sub-asset token that the asset token or sub-asset token can no longer be transacted/used. When an asset token or a sub-asset token is destroyed, the destruction even can be recorded in the blockchain. Since entries in a blockchain are not removed, the blockchain entries associated with the one or more asset tokens and/or sub-asset tokens that were recorded in the past (i.e., prior to the destruction of the one or more asset tokens and/or sub-asset tokens), are retained on the blockchain, thereby preserving the "history" of the asset token(s)/sub-asset token(s). In some embodiments, once the asset token or sub-asset token is destroyed, the asset token or sub-asset token can no longer be transacted.

As an example relating to transfer of asset ownership, suppose user A (of the asset token system) owns a car, and user B (of the asset token system) desires to purchase the car. Initially, the car may be located in a garage of user A, and user A "owns" (i.e., has access to a private cryptographic key associated with) an asset token that represents the car, as defined within a location smart contract associated with the garage of user A. In other words, user A is in possession of both the physical car in his garage, as well as the private cryptographic key of the asset token. To affect the sale of the car from user A to user B, user A instructs his location smart contract to "move" the asset token for the car to a location smart contract belonging to user B (e.g., send a signal encoding the asset token from a compute device of user A to a compute device of user B for incorporation into the smart contract belonging to user B, and remove the asset token from the smart contract of user A). For the instruction to be executed by the asset token system, user A should have the authority to move the asset token (i.e., he/she should be in possession of the private cryptographic key associated with the relevant asset token). As such, the asset token system can make a determination as to whether user A has sufficient authority to move the asset token before permitting the movement of the asset token. In exchange for the movement of the asset token from user A's smart contract to user B's smart contract, user B pays user A (e.g., by instructing the payment of currency or cryptocurrency to user A). The payment for the car from user B to user A can occur automatically, for example upon detection, at a compute device of user B, of a modification of user B's location smart contract to include the car's asset token. The payment for the car from user B to user A can occur substantially concurrently with the movement of the asset token from user A's smart contract to user B's smart contract. Once the transaction has completed (and, optionally, been validated by some or all users of the relevant asset token system, e.g., in collaboration with a plurality of nodes of a blockchain network associated with the blockchain), the sale transaction is recorded to the blockchain (i.e., an associated blockchain block is generated and stored in a distributed manner within the asset token system).

Non-Fungible Asset Tokens

Known smart contracts can control fungible assets by recording a token balance for each blockchain address having tokens. Fungible asset smart contracts can be treated as a specific class of assets that are fungible within the class but not within other classes. Transfers of the fungible assets can be performed by subtracting from one balance and adding to another. Such balances can be maintained by the smart contract in map form, and indexed by account addresses. Non-fungible assets, however, are unique and, if applied to known smart contract techniques, would necessitate the generation of unique records of every asset owned by an account address. Because non-fungible assets can include a large quantity of sub-assets (and, correspondingly, a large volume of data associated therewith), such data related to the non-fungible assets would not be suitable for storage on a blockchain.

Figure 2:
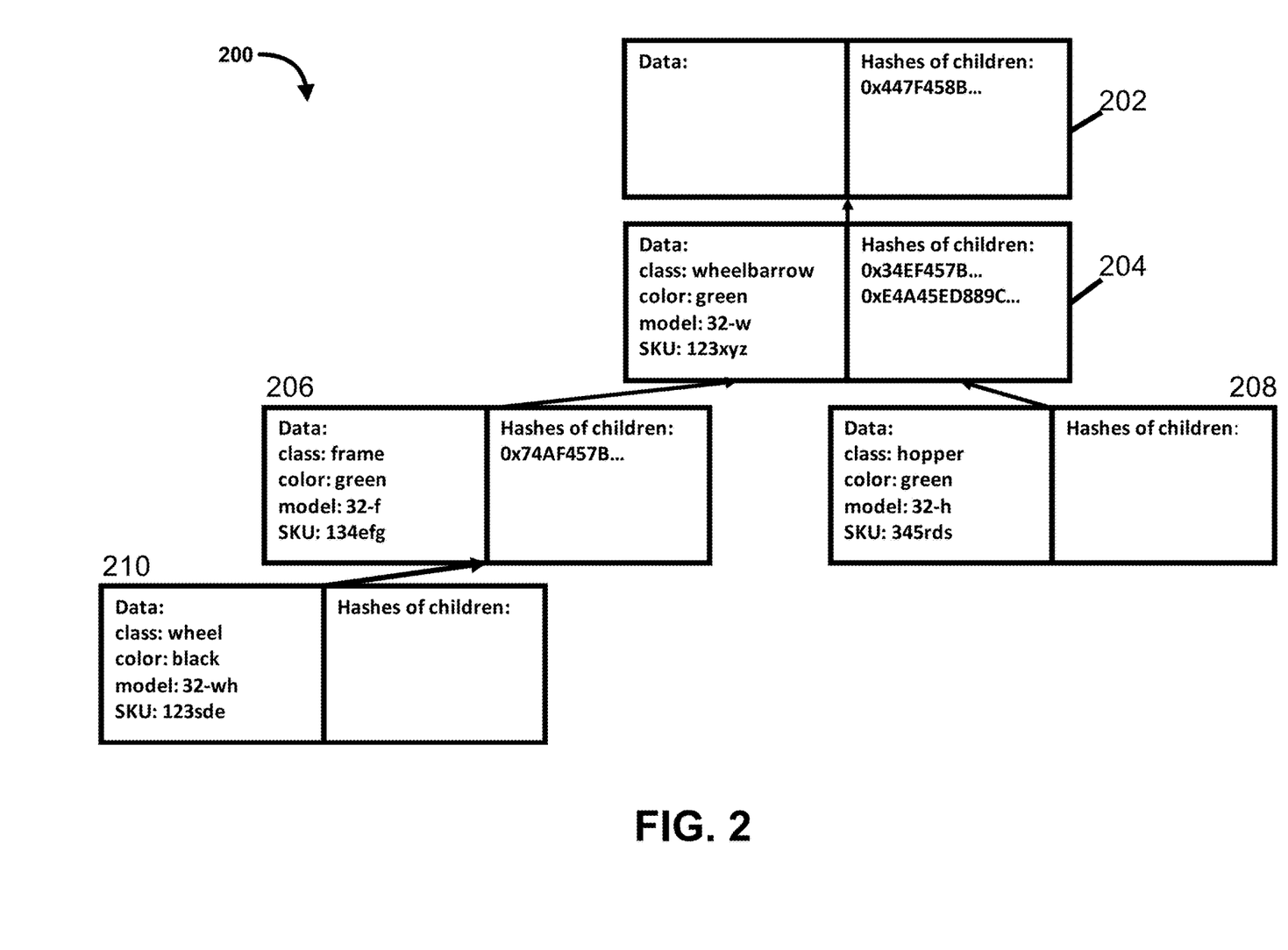
FIG. 2 shows an asset token data structure for an asset comprising a plurality of sub-assets (e.g., a wheelbarrow), the asset token data structure having a hierarchical, hash-linked tree structure, according to some embodiments.

The foregoing problem is addressed, according to embodiments set forth herein, by generating representations of the assets, for example as nodes in a "modified" Merkle tree (a Merkle tree can also be referred to as a "Hierarchical Merkle ("HM") tree"), as shown in FIG. 2. A modified Merkle tree differs from an HM tree in that each node of the modified Merkle tree includes data records, whereas in a traditional Merkle tree, only the leaf nodes include data. In an HM tree, all assets owned by an account address can be represented by a collection of associated hash values on the blockchain, each representing a root of an HM tree, thereby rendering the data storage tractable and/or suitable for zero-knowledge proof ("zk-proof"). The HM tree itself can be stored off-chain, with only the root hash stored on the blockchain. In some implementations, a general-purpose isomorphic database (e.g., a swarm database) is used to store the HM tree. A smart contract can then store asset data and/or owner data as a map, for example as follows:

map(address=>uint) assets or map(uint=>address) owners, where each "uint" is an unsigned integer (e.g., a "natural number") whose value represents a HM tree root hash. In other embodiments, which may be less scalable, a separate token contract can be generated for each asset class of a plurality of asset classes.

In some embodiments, an asset token for an asset comprising multiple sub-assets (e.g., a wheelbarrow) has a hierarchical, hash-linked tree data structure 200, as shown in FIG. 2. As used herein, "hierarchical" refers to a data structure in which at least one node of multiple nodes has at least one parent node from which it depends, and at least one child node depending therefrom. As used herein, a "node" refers to a portion of the asset token's hierarchical data structure (e.g., a subset of data that is stored locally and/or in a distributed manner). At root node 202, a hash of child node 204 ("0x447F458B . . . ") can be stored, and a hash (or other identifier) of the root node 202 itself (not shown) can be stored in memory and transacted on a blockchain. In some implementations, the root node 202 contains no data. Each root hash can have an owner, for example using a blockchain smart contract, and the owner can be represented by an identifier such as a blockchain address. In other words, the root hash can function as a key to a mapping having the owner's identifier as the corresponding value of the mapping. As such, ownership of an asset represented by a tree data structure 200 can be established by querying the smart contract. Ownership of the asset can be changed via a blockchain transaction that records/stores, in a block of the blockchain, an identifier (e.g., blockchain address) of a new owner. "Ownership," as used herein, is not limited to physical control of an asset, and can include legal and/or other types of ownership.

Intermediate nodes (e.g., 204 and 206), also referred to herein as "subsidiary nodes," can store data for the asset or sub-asset with which they are associated, as well as hashes of any child nodes or sub-assets thereof. For example, node 204 (corresponding to hash 0x447F458B . . . ) has a defined class of "wheelbarrow," and includes asset data including color ("green"), model ("32-w") and SKU number ("123xyz"). As an "intermediate" node, node 204 also stores both the associated asset data as well as hashes for children nodes 206 and 208 ("0x34EF457B . . . " and "0XE4A45ED889C . . . ," respectively). Child nodes 206 and 208 correspond to a frame and a hopper of the wheelbarrow, respectively. For example, node 206 has a defined class of "frame," and includes asset data including color ("green"), model ("32-f") and SKU number ("134efg"). Like node 204, node 206 is also an intermediate node, and as such stores both the associated asset data as well as a hash for child node 210 ("0x74AF457B . . . "). Node 208 has a defined class of "hopper," and includes asset data including color ("green"), model ("32-h") and SKU number ("345rds"). Node 210 has a defined class of "wheel," and includes asset data including color ("black"), model ("32-wh") and SKU number ("123sde"). Because nodes 208 and 210 do not have child nodes depending therefrom, they do not include child hashes, and can thus be referred to as "leaf nodes," or "further subsidiary nodes" of other subsidiary nodes.

In some implementations, and in view of the hierarchical structure, referencing and storage of the data, any change made to the asset tree at any node thereof results in a change to the root hash. Each node of the hierarchical, hash-linked tree data structure 200 can be stored in a content-addressed data store, whereby a storage location of each node is represented by the hash of that node (e.g., including the hashes of any child nodes), thereby creating an immutable tree in which the root node hash (stored in a block on the blockchain) can be used to access the entire tree and all of the data therein. For example, a root node can be associated with a "key pair" including a public cryptographic key and a private cryptographic key. The public cryptographic key can be stored on the blockchain and used to reference the asset token data, whereas the private cryptographic key is accessible only by a current owner of the asset token (and, typically, the underlying asset). The private cryptographic key can be used, by the asset owner, to make changes to the asset token's data (e.g., thereby prompting the generation of a new asset token that includes the changes, and prompting the destruction of the original asset token) and/or to transfer ownership of the asset token, as discussed further below. In some embodiments, hash values of the present disclosure are stored in an account associated with the asset token system. In some embodiments, when changes are made to the asset token's data, a new root node (associated with the key pair) and associated hash are generated. The new root hash is stored/recorded on the blockchain, and asset token data of the new root node can be referenced by the public cryptographic key. Additional changes to the asset token data of the new root node can be made by the asset owner using the private cryptographic key. The account storing hash values can be controlled, for example, by a smart contract.

As an example of an asset modification, suppose that a frame of an automobile is having wheels added to it as part of a manufacturing process. The frame and the wheels may initially each have their own asset tokens associated with them. Once the wheels are added to the frame, the descriptions of the frame and the wheels (as represented by their associated asset data stored in their associated asset tokens) can be said to no longer accurately reflect the physical reality. In other words, the wheels and frame are no longer separate physical entities, for purposes of tracking, but rather have been merged into a composite (i.e., more "complex") asset. To resolve this, the data associated with the original frame asset token can be modified to include reference(s) to the wheels, and a new asset token (with a new root node, an intermediate node for the frame, and a leaf node for the wheels) can be generated based on the modified data. Correspondingly, the original frame and wheel asset tokens are destroyed such that each physical part is only represented once within the asset token system. Stated another way, when tangible physical assets are combined into a composite asset, the data associated with each sub-asset is preserved by storing the data in a single, combined asset token (and, correspondingly, the sub-asset tokens are destroyed).

In some embodiments, a new/additional subsidiary node can be generated and added to the hierarchical hash-linked tree structure in response to an assembly or joining of a new tangible sub-asset with a tangible sub-asset already defined within the hierarchical hash-linked tree structure. Similarly, a new/additional subsidiary node can be generated and added to the hierarchical hash-linked tree structure in response to a modification to the tangible asset such that the tangible asset includes an additional tangible sub-asset.

Figure 1A:
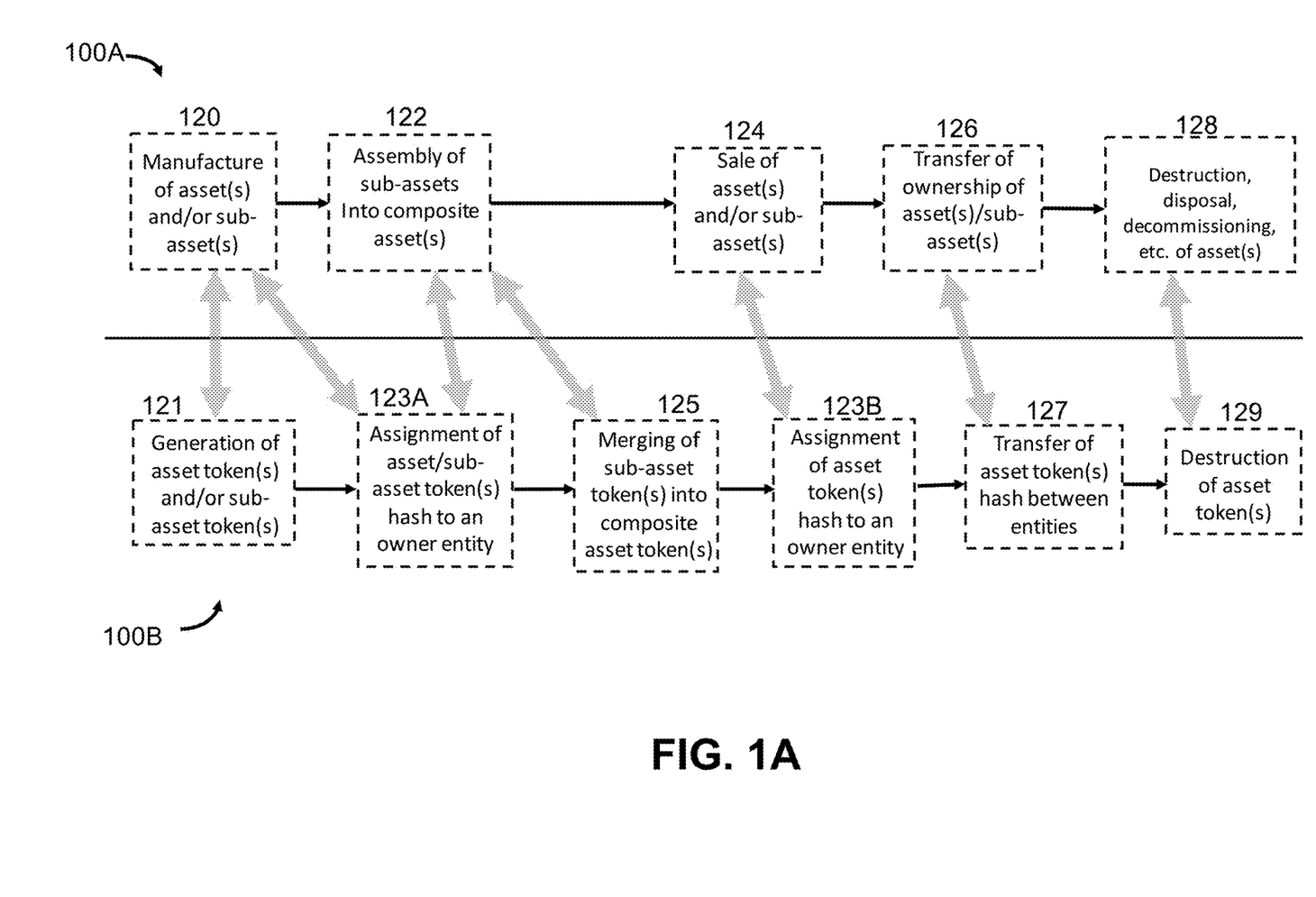
FIG. 1A is a flowchart showing associations between real-world supply chain events and asset token-related events of the present disclosure, according to some embodiments.
Figure 1B:
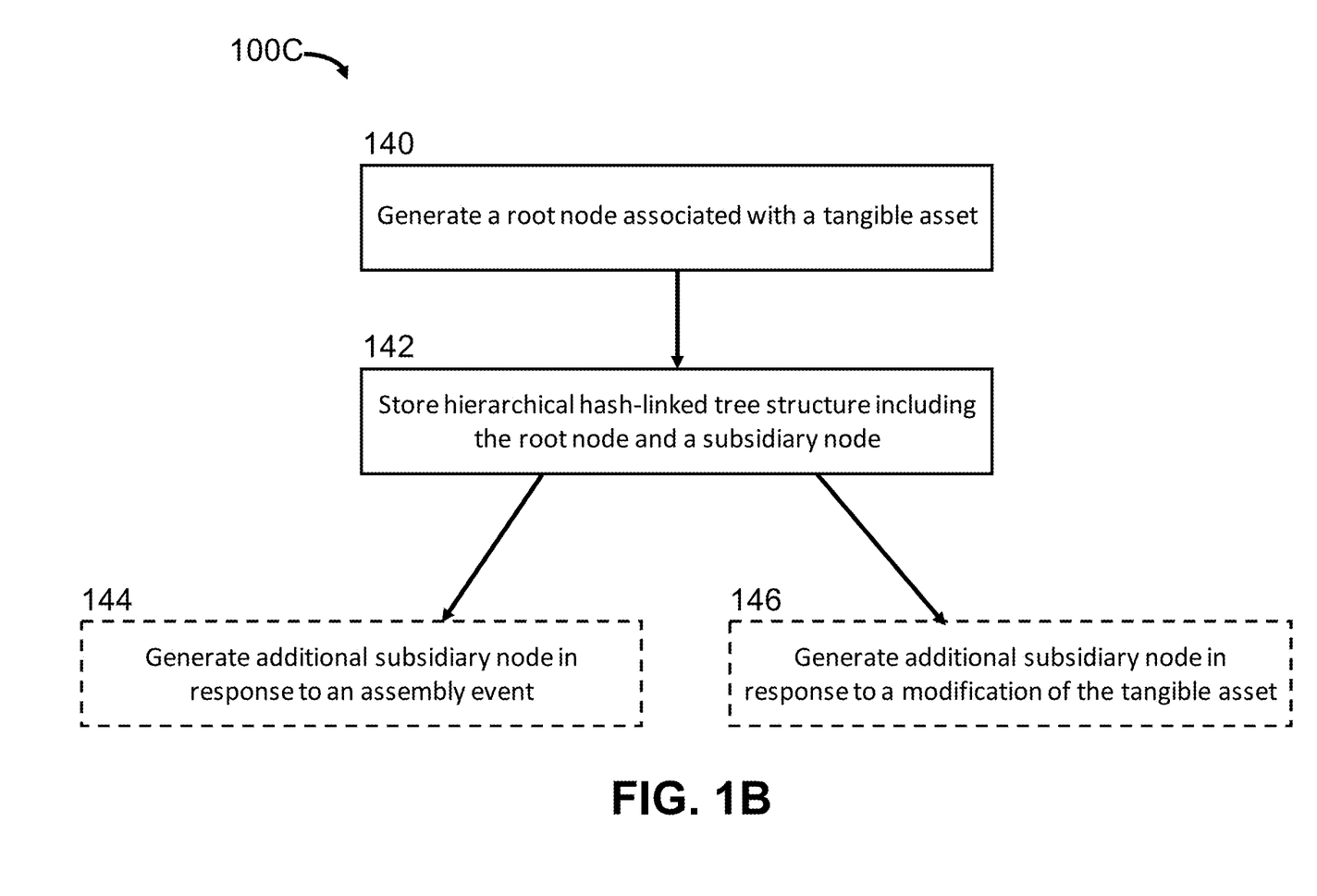
FIG. 1B is a flowchart showing a method of generating a hierarchical hash-linked tree structure of an asset token, according to a first embodiment.

FIG. 1B is a flowchart showing a method 100C of generating a hierarchical hash-linked tree structure of an asset token, according to a first embodiment. As shown in FIG. 1B, the method 100C includes generating a root node associated with a tangible asset, at 140, via a processor. The root node includes (1) a first hash value that represents a storage location of the root node, (2) data (e.g., a color, a physical size, a quantity, a make, a model, and/or assay information) associated with a tangible asset (e.g., a machine or a parcel of land), and (3) a second hash value that represents a storage location of a subsidiary node. The method 100C also includes storing (e.g., off-chain), at 142, a hierarchical hash-linked tree structure in a non-transitory, processor-readable memory. The hierarchical hash-linked tree structure can include multiple nodes. The multiple nodes include the root node and the subsidiary node. The subsidiary node has the second hash value, and data associated with a tangible sub-asset of the tangible asset. The method 100C optionally also includes generating, at 144, a second subsidiary node in response to an assembly event (e.g., assembly of a second tangible sub-asset with the tangible sub-asset) and/or generating, at 146, a second subsidiary node in response to a modification to the tangible asset such that the tangible asset includes a second tangible sub-asset.

Figure 1C:
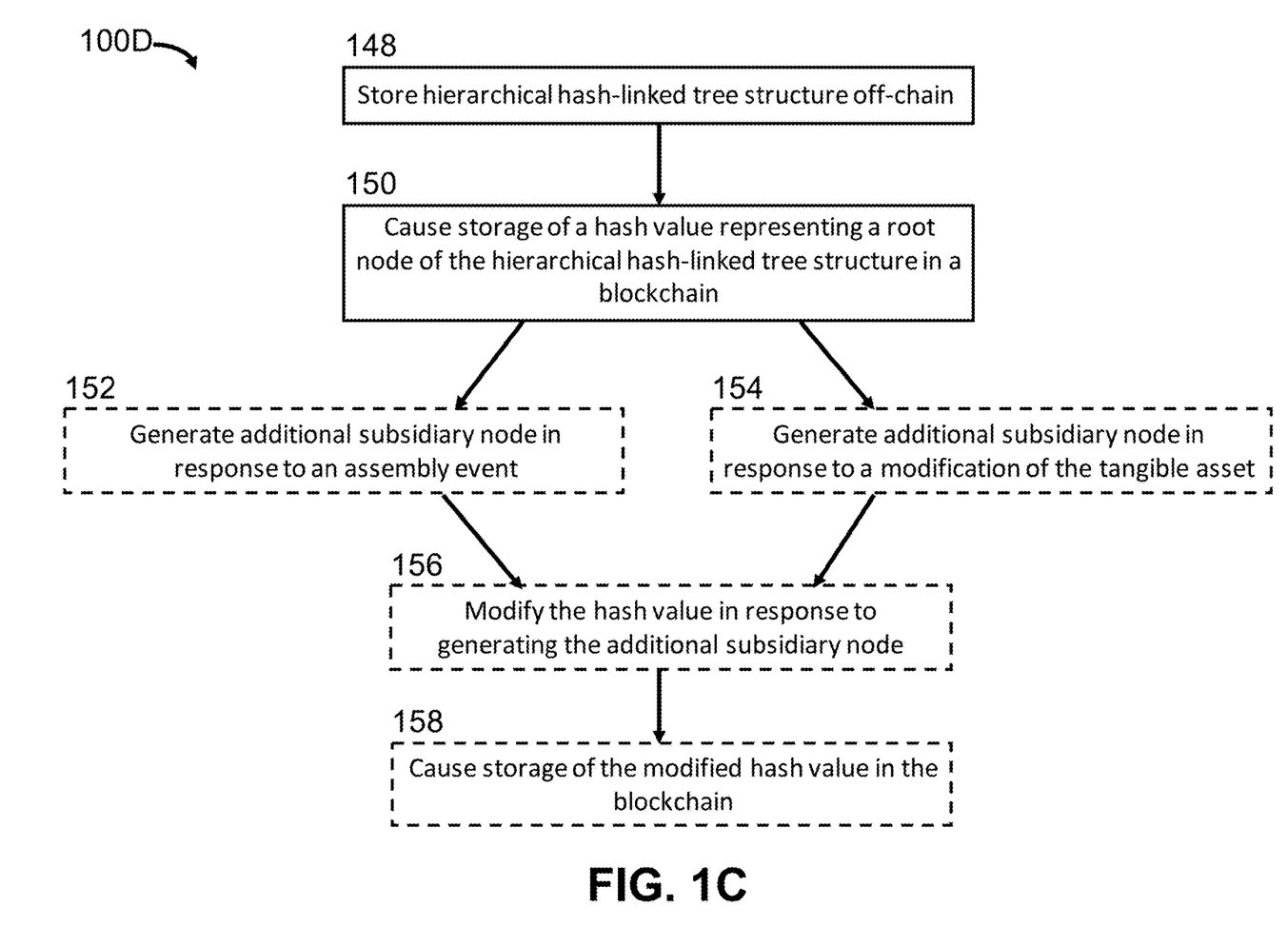
FIG. 1C is a flowchart showing a method of generating and modifying an asset token, according to a second embodiment.

FIG. 1C is a flowchart showing a method 100D of generating and modifying an asset token, according to a second embodiment. As shown in FIG. 1C, the method 100D includes storing, at 148, a hierarchical hash-linked tree structure off-chain, and causing, at 150, storage of a hash value in a blockchain. The hash value can represent an off-chain storage location of a root node of the hierarchical hash-linked tree structure. The hash value can also be associated with a state of a smart contract, where the smart contract includes a representation of an owner of a tangible asset (e.g., a machine or a parcel of land) or a representation of a location of the tangible asset. The root node includes data associated with the tangible asset, and the hierarchical hash-linked tree structure includes a subsidiary node storing data associated with a tangible sub-asset of the tangible asset. The method 100D optionally also includes generating, at 152, a second subsidiary node in response to an assembly of a second tangible sub-asset with the first tangible sub-asset, or generating, at 154, a second subsidiary node in response to a modification to the tangible asset such that the tangible asset includes a second tangible sub-asset. The method 100D also includes optionally modifying, at 156, the hash value in response to generating the second subsidiary node, and causing storage in the blockchain, at 158, of the modified hash value. The method 100D can also include modifying the hierarchical hash-linked tree structure in response to a destruction of the tangible asset (not shown), such that the hierarchical hash-linked tree structure includes an indication that an asset token associated with the hierarchical hash-linked tree structure can no longer be transacted. In some such embodiments, the hierarchical hash-linked tree structure is a first hierarchical hash-linked tree structure, and the method also includes generating a third hierarchical hash-linked tree structure, in response to an assembly of the first tangible asset with a second tangible asset.

Figure 1D:
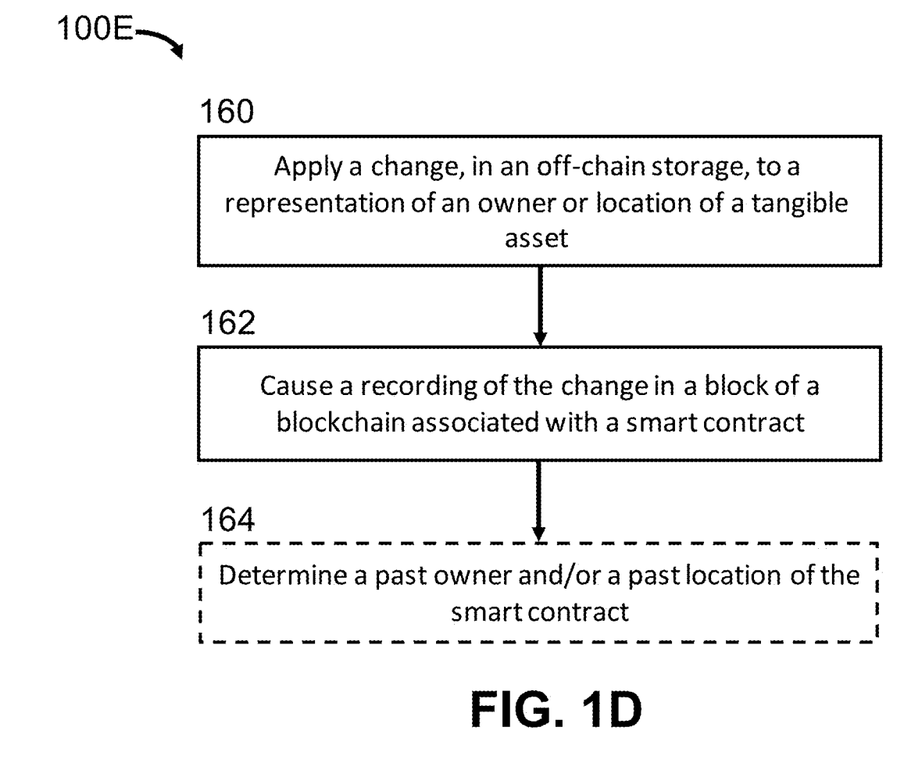
FIG. 1D is a flowchart showing a method of modifying ownership or location of a tangible asset represented by an asset token, according to a third embodiment.

FIG. 1D is a flowchart showing a method 100E of modifying ownership or location of a tangible asset represented by an asset token, according to a third embodiment. As shown in FIG. 1D, the method 100E includes modifying an ownership or a location of a tangible asset (e.g., a machine or a parcel of land) associated with a smart contract (the modifying represented, for example, by steps 160 and 162). The smart contract can have a state that includes a hash value and a representation of an owner of the tangible asset and/or a representation of a location of the tangible asset. The modifying includes applying a change, at 160, in an off-chain storage, to the representation of the owner of the tangible asset and/or the representation of the location of the tangible asset; and causing a recording (or storage), at 162, of the change in a block of a blockchain associated with the smart contract. Subsequently, the method 100E can optionally also include determining a past owner and/or a past location of the smart contract, at 164. In some implementations, the determining the past owner and/or the past location of the smart contract is performed iteratively, for example to "track" a property of the tangible asset through a series of past owners and/or past locations that indicate a history of the property of the tangible asset. The property being tracked can be, for example, an ownership, a configuration, a size, a location, a condition, a remaining shelf life, an associated value, or any other mutable attribute.

Asset Token Blockchain Components

Depending upon the desired application, embodiments of a blockchain-based asset token system or method can include one or more of the following: (1) one or more asset tokens, e.g., represented by a Merkle tree; (2) one or more "smart contracts" (defined below) configured to manipulate one or more asset tokens; (3) a graphical user interface ("GUI"); (4) a database (e.g., a swarm distributed database) in communication with the blockchain and configured to store asset information; (5) one or more oracles configured to provide one or more representational state transfer application program interfaces (Restful APIs, or "REST APIs") for manipulating/transacting assets; and (6) an Enterprise Resource Planning ("ERP") system integration built, for example, on the one or more REST APIs. As used herein, an "oracle" (or "oracle machine") is a computing device configured to trigger a smart contract to execute when original terms, translated by the oracle, are met. A smart contract can interact with off-chain data using an oracle. The GUI can be used, for example, to display a composite rendering of all assets within a supply chain that are being managed by the systems and methods described herein, e.g., in a single view. A "smart contract," as used herein, refers to a computer program or protocol for facilitating, verifying and/or enforcing the electronic negotiation and/or performance of a contract or other transaction. For example, a smart contract of the present disclosure can be similar to an Ethereum token standard ("ERC-20") contract. A smart contract can facilitate the execution of credible transactions without the intervention of a third party. When implemented in connection with a blockchain smart contract transactions can be trackable and irreversible.

Asset Token System Overview

Figure 3:
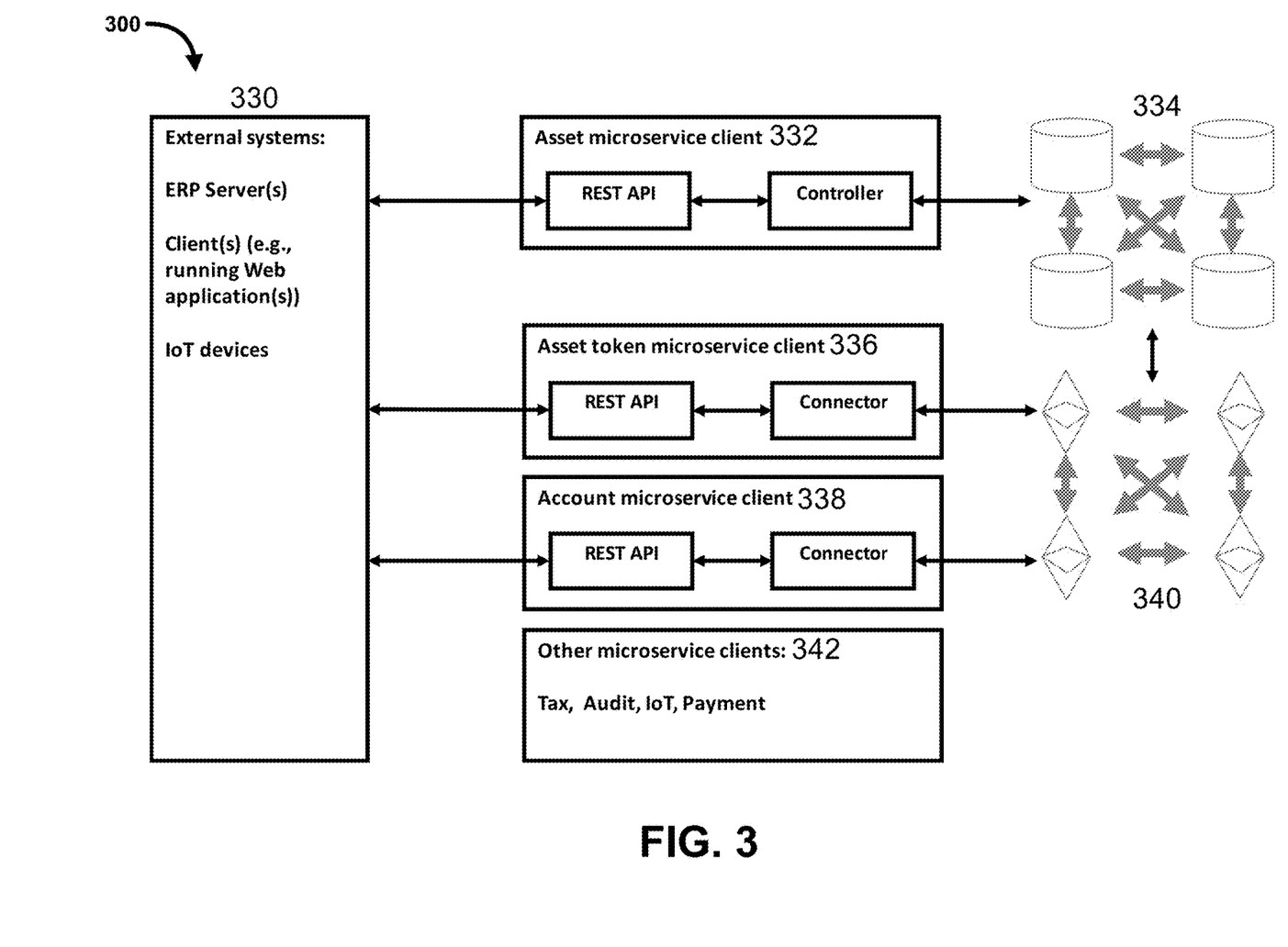
FIG. 3 shows a system for asset token transactions, according to some embodiments.

An application architecture for asset token transactions is configured as shown in FIG. 3, according to an embodiment. As shown in FIG. 3, one or more external systems 330, such as one or more ERP servers, one or more client/user computing devices, for example running Web applications, and/or a networked system of IoT devices, are in operable communication (e.g., in wireless and/or wired network communication) with an asset microservice client 332, an asset token microservice client 336, and an account microservice client 338, each of which includes an associated REST API and Controller. The asset microservice client 332 is in operable communication (e.g., in wireless and/or wired network communication) with a storage unit 334 (e.g., a swarm distributed storage unit), and each of the asset token microservice client 336 and the account microservice client 338 is in operable communication (e.g., in wireless and/or wired network communication) with a computer system implementing a blockchain 340 (e.g., an Ethereum blockchain). The storage unit 334 can store, for example, the off-chain asset data discussed above with reference to FIGS. 1A-1D and/or FIG. 2. Optionally, additional microservice clients 342 can also be incorporated into the system architecture, e.g., for IoT monitoring or for tax/transaction payments or auditing (discussed further below). The memory may include program instructions and data. Any of the one or more external systems 330, the asset microservice client 332, the asset token microservice client 336, the account microservice client 338, the blockchain 340, and the additional microservice clients 342 each can include a processor that controls the operation of the associated device. A processor can be, for example, a microprocessor, a microcontroller, a digital signal processor (DSP) or other device known in the art. The processor typically performs logical and arithmetic operations based on program instructions and/or data received from a memory (e.g., storage unit 334).

In some implementations, the IoT devices are disposed at one or more locations within a supply chain (e.g., manufacturing plants, distribution channels, shipping vehicles, etc.), and can include position sensors (e.g., global positioning system ("GPS") sensors), temperature sensors (e.g., in delivery truck(s) of a distribution channel), accelerometers, pressure sensors, chemical sensors, and/or the like.

Transfer of Non-Fungible Assets

In some embodiments, transferring a non-fungible asset token includes more steps than would be used for a fungible asset token. For example, if the non-fungible asset is to be transferred in its entirety, the asset owner transfers their ownership of an asset hash to another entity (e.g., an Ethereum address) by making a blockchain transaction and without changing any of the off-chain asset data. Typically, only the asset owner has the ability to effect such a transfer (e.g., as enforced by one or more token smart contracts). Once transferred to the new owner, he/she is free to combine the non-fungible asset with another asset to define a new single composite asset, if desired, for example by (1) deleting the two root hashes corresponding to the two existing assets that are to be combined, (2) generating a new root asset that represents the combined asset, and (3) generating, optionally substantially concurrently with (2), an off-chain combined asset record. Also, an owner is free to delete any asset by removing the associated root hash from the blockchain and generating any asset by adding a root hash to the blockchain. Each addition and deletion can be recorded as a blockchain transaction, such that inquiries can be made, for example about the structure of a newly-created asset. The use of a hash tree, as described herein, can therefore immutably link an asset to its hash on the blockchain. Alternatively or in addition, a user can delete one or more sub-assets from an asset by removing the associated intermediate/subsidiary nodes (including the data and hash(es) stored therein) and/or leaf node hash(es) (including the data and hash(es) stored therein) from the hierarchical asset data tree. Such modifications to an asset can result in the generation of a new root node hash and the recording of the new root node hash on the blockchain.

Management of Non-Physical Asset Tokens

In addition to the management of complex/physical assets, methods and systems of the present disclosure can include functionality for performing auditing and the payment of taxes, for example via a payment infrastructure. In some embodiments, purchase orders, payments received, invoices, and/or the like are treated as supply chains and are transacted/manipulated using the methods and systems described herein. Such "assets" can therefore be tracked in a manner similar to that of a tangible asset, and can be audited by retrieving their associated histories from the blockchain. For such implementations (which can be referred to as "notarization"), settlement can be made off-chain.

In other embodiments, a smart contract interface can be provided, for example, to one or more banking APIs to facilitate automatic payments (e.g., value-added tax ("VAT") payments) via the smart contract. Such payments can be secured by restricting payment requests to those originating from a pre-specified blockchain address. For such implementations, the processing and receipt of the payments can occur off-chain.

In still other embodiments, a crypto-token can be generated that is tied (or "pegged") to a value of a fiat currency and is readily exchangeable for the same, thereby permitting fully auditable on-chain payments to be made. In such an embodiment, a crypto-token can be purchased (e.g., at a bank) by a purchaser, and the bank can, in turn, "mint" a crypto-token (e.g., a crypto-coin), having the purchaser as the owner, and record the transaction on the blockchain. Alternatively or in addition, taxes can be paid, for example to a Government blockchain address. Alternatively or in addition, Ethereum tokens can be used as a payment currency.

For all embodiments described herein that include the use of a smart contract, it is contemplated that manual intervention can be applied, for example to prevent a smart contract from making payment, if desired. Smart contract-based payments are typically a passive activity (i.e., action is actively taken only to stop payment, not to make payment), thereby increasing a speed of payments.

In some embodiments, a method for transferring ownership of, and tracking of, tangible assets, is performed using a blockchain and via a processor. The method can include generating a root node associated with a tangible asset via the processor. The root node includes (i.e., is generated such that it includes): (1) a first hash value that represents a storage location of the root node, (2) data (e.g., a color, a physical size, a quantity, a make, a model, and/or assay information) associated with a tangible asset (e.g., a machine or a parcel of land), and (3) a second hash value that represents a storage location of a subsidiary node. The method also includes storing a hierarchical hash-linked tree structure in a non-transitory, processor-readable memory (e.g., off-chain). The hierarchical hash-linked tree structure can include multiple nodes. The multiple nodes include the root node and the subsidiary node. The subsidiary node has the second hash value, and data associated with a tangible sub-asset of the tangible asset. The method can also include generating a second subsidiary node in response to an assembly of a second tangible sub-asset with the tangible sub-asset and/or in response to a modification to the tangible asset such that the tangible asset includes a second tangible sub-asset. As used herein, the term "assembly" can refer to a fitting together of component parts of a machine or other object (e.g., the mechanical attachment of parts to one another via fasteners, chemical attachment, etc.), or to a physical collocation or gathering of multiple objects in one or more receptacles (e.g., combining multiple parts in a box).

In some embodiments, a method includes storing a hierarchical hash-linked tree structure off-chain, and causing storage of a hash value in a blockchain. The hash value can represent an off-chain storage location of a root node of the hierarchical hash-linked tree structure. The hash value can also be associated with a state of a smart contract, where the smart contract includes a representation of an owner of a tangible asset (e.g., a machine or a parcel of land) or a representation of a location of the tangible asset. The root node includes data associated with the tangible asset, and the hierarchical hash-linked tree structure includes a subsidiary node storing data associated with a tangible sub-asset of the tangible asset. The method can also include generating a second subsidiary node in response to a modification to the tangible asset such that the tangible asset includes a second tangible sub-asset, or in response to an assembly of a second tangible sub-asset with the first tangible sub-asset, modifying the hash value in response to generating the second subsidiary node, and causing storage, in the blockchain, of the modified hash value. Alternatively, the method can also include modifying the hierarchical hash-linked tree structure in response to a destruction of the tangible asset, such that the hierarchical hash-linked tree structure includes an indication that an asset token associated with the hierarchical hash-linked tree structure can no longer be transacted. In some such embodiments, the hierarchical hash-linked tree structure is a first hierarchical hash-linked tree structure, and the method also includes generating a third hierarchical hash-linked tree structure, in response to an assembly of the first tangible asset with a second tangible asset. The third hierarchical hash-linked tree structure can include the data of the first hierarchical hash-linked tree structure and data of a second hierarchical hash-linked tree structure associated with the second tangible asset.

In some embodiments, a method includes modifying an ownership or a location of a tangible asset (e.g., a machine or a parcel of land) associated with a smart contract. The smart contract can have a state that includes a hash value and one of a representation of an owner of the tangible asset or a representation of a location of the tangible asset. The modifying includes (1) applying a change, in an off-chain storage, to one of the representation of the owner of the tangible asset or the representation of the location of the tangible asset; and (2) causing a recording (or storage) of the change in a block of a blockchain associated with the smart contract. In some such embodiments, the block is a first block, and the method also includes determining one of a past owner or a past location of the smart contract. The determining includes (1) detecting, within the blockchain, a second block associated with the smart contract, the second block preceding the first block; (2) identifying a hash value of the second block; and (3) retrieving off-chain data stored at a storage location represented by the hash value of the second block. The method can also include receiving a private cryptographic key prior to modifying the one of the ownership or the location of the tangible asset, and identifying a user as an authorized user of the smart contract based on the cryptographic key. In some such embodiments, once a user is identified as an authorized user, he/she can make modifications to the hierarchical hash-linked tree structure (or asset token). In some embodiments, the method can also include detecting the modification of the one of the ownership or the location of the tangible asset, and triggering a payment in response to detecting the modification. Alternatively or in addition, the method can also include validating, in collaboration with a plurality of nodes of a blockchain network, the modification of the one of the ownership or the location of the tangible asset prior to the recording the change in a block of a blockchain.

In some embodiments, a method includes defining a first asset token for a tangible asset. The first asset token has a hierarchical hash-linked tree structure with a plurality of nodes including a root node, an intermediate node, and a leaf node. The first asset token and an associated key pair are stored in a memory. The key pair includes a first public key and a private key. The first root hash and the first public key are stored in a blockchain, and a configuration of the asset can be tracked. The tracking includes generating a second asset token, adding an indication to the first asset token (i.e., to a hierarchical hash-linked tree structure associated with the first asset token) that the first asset token associated with the hierarchical hash-linked tree structure can no longer be transacted/used, and recording a second root hash value associated with the second asset token in the blockchain.

In some embodiments, a method includes storing a hierarchical hash-linked tree structure in a non-transitory, processor-readable memory. The hierarchical hash-linked tree structure can include multiple nodes. The multiple nodes can include a root node and, optionally, one or more subsidiary nodes. The root node can include a hash value that represents its storage location, a list of hashes of one or more subsidiary nodes (if any), and, optionally, also includes data associated with a tangible asset, a financial instrument (e.g., an aggregated financial instrument), a right associated with a tangible asset, or an obligation associated with a tangible asset. The one or more subsidiary nodes can each include a hash value representing an associated storage location thereof and a list of hashes of one or more further subsidiary nodes (if any), and can optionally also include data associated with a tangible sub-asset, a further constituent financial instrument that is part of an aggregated financial instrument. a right associated with a tangible sub-asset, or an obligation associated with a tangible sub-asset.

In some embodiments, a processor-implemented method includes storing, in a blockchain and as a state of a smart contract, a hash value of a root node of a hierarchical hash-linked tree structure. The smart contract can include an identifier of an owner of an asset (e.g., a tangible asset or a financial instrument or a right or obligation associated with a tangible asset) and/or an identifier of a location of the asset.

In some embodiments, a smart contract holds a hash of a root node of a hierarchical hash-linked tree structure as part of a state of the smart contract, and the smart contract can be used to change an ownership or location associated with an asset (e.g., a tangible asset or a financial instrument or a right or obligation associated with a tangible asset) by changing the hash of the root node (e.g., in response to a change in one or more data values in the hierarchical hash-linked tree structure). Alternatively or in addition, the smart contract can be used to control a set of permissions specifying who can alter (e.g., using a cryptographic key) an ownership and/or location associated with the asset referenced thereby.

In some embodiments, a processor-implemented method includes tracking an owner and/or location of an asset (e.g., a tangible asset or a financial instrument or a right or obligation associated with a tangible asset) by examining historical changes to a smart contract associated with the asset, where the smart contract has a state that includes a hash (e.g., recorded on an associated blockchain) of a root node of a hierarchical hash-linked tree structure associated with the asset.

Additional embodiments related to or compatible with the present disclosure are set forth in U.S. Patent Application Publication No. 2020/0034457, published Jan. 30, 2020, the entire contents of which are incorporated by reference herein in their entirety.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. They are presented to assist in understanding and teach the embodiments.

It should be understood that they are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. A method for information storage and retrieval using an off-chain database and a distributed ledger, comprising:
causing storage, in the distributed ledger, of a first hash value representing a first off-chain storage location of an off-chain database in which a root node of a first hierarchical hash-linked tree data structure is stored, the first hash value associated with a state of a smart contract that includes a second hash value of the root node of the first hierarchical hash-linked tree data structure, the state of the smart contract representing a snapshot of data stored in the smart contract, the first hierarchical hash-linked data structure representing tangible asset data for a tangible asset, the off-chain database not including a copy of any block within the distributed ledger;
modifying a representation of the tangible asset data located at the off-chain database in response to receipt of a private cryptographic key from a user that represents a location of the smart contract having an address of the distributed ledger;
generating a subsidiary node in response to the modification of the representation of the tangible asset data;
modifying the first hierarchical hash-linked tree data structure to include the subsidiary node, to produce a second hierarchical hash-linked tree data structure; and
causing storage, in the off-chain database at a second off-chain storage location, of the second hierarchical hash-linked tree data structure.

2. The method of claim 1, further comprising:
modifying one of an ownership or a location of the tangible asset, the state of the smart contract including one of a representation of the ownership of the tangible asset or a representation of the location of the tangible asset, the modifying including (1) applying a change, in the off-chain database, to one of the representation of the ownership of the tangible asset or the representation of the location of the tangible asset; and (2) causing a recording of the change in a block of the distributed ledger.

3. The method of claim 2, further comprising:
detecting the modification of the one of the ownership or the location of the tangible asset; and
triggering a payment in response to detecting the modification.

4. The method of claim 2, further comprising:
validating, in collaboration with a plurality of nodes of a blockchain network, the modification of the one of the ownership or the location of the tangible asset prior to the recording of the change in the block of the blockchain.

5. The method of claim 1, wherein the off-chain storage location of the off-chain database is a first off-chain storage location, the method further comprising:
determining one of a past ownership or a past location of the smart contract, the determining including (1) detecting, within the distributed ledger, a block associated with the smart contract; (2) identifying a hash value of the block; and (3) retrieving data stored at a second off-chain storage location of the off-chain database, the second off-chain storage location represented by the hash value of the block.

6. The method of claim 1, further comprising:
determining one or more past owners of the tangible asset to produce an ownership history of the tangible asset.

7. The method of claim 1, further comprising:
receiving, prior to modifying one of an ownership or a location of the tangible asset, a private cryptographic key; and
identifying the user as an authorized user of the smart contract based on the private cryptographic key.

8. The method of claim 1, wherein the tangible asset is one of a machine or a parcel of land.

9. A processor-implemented method for information storage and retrieval using a distributed ledger, comprising:

generating, via the processor and for a first tangible asset represented by a first hierarchical hash-linked tree data structure stored in an off-chain database, a first root node associated with the first tangible asset, the first root node having (1) a first hash value, stored in a distributed ledger, that represents an off-chain storage location of the first root node, (2) data associated with the first tangible asset, and (3) a second hash value of the first root node of the first hierarchical hash-linked tree data structure that represents a storage location of a subsidiary node of the first root node, wherein the first hash value being associated with a state of a smart contract that includes the second hash value, the state of the smart contract representing a snapshot of data stored in the smart contract; and generating, via the processor and in response to combining the first tangible asset and a second tangible asset, a second root node of a second hierarchical hash-linked tree data structure associated with a third tangible asset including the first tangible asset and the second tangible asset, the second root node having (1) a third hash value that represents an off-chain storage location of the second root node, (2) data associated with the third tangible asset, and (3) a fourth hash value that represents a storage location of a subsidiary node of the second root node of the second hierarchical hash-linked tree data structure.

10. The processor-implemented method of claim 9, further comprising
causing storage, in a non-transitory, processor-readable memory, of a third hierarchical tree data structure having a plurality of nodes including:
the first root node, the second root node, the subsidiary node of the first root node, and the subsidiary node of the second root node.

11. The processor-implemented method of claim 10, wherein at least one of the first hierarchical tree data structure or the second hierarchical tree data structure is stored off-chain.

12. The processor-implemented method of claim 9, wherein each of the data associated with the first tangible asset and the data associated with the third tangible asset includes at least one of a color, a physical size, a quantity, a make, a model, or assay information.

13. The processor-implemented method of claim 9, wherein the subsidiary node of the first root node is a first subsidiary node, the method further comprising:
generating a second subsidiary node for the first root node in response to a modification to the first tangible asset, and
generating a second subsidiary node for the second root node in response to generating the second subsidiary node for the first root node.

14. The processor-implemented method of claim 9, further comprising:
detecting a modification of one of an ownership or a location of at least one of the first tangible asset, the second tangible asset, or the third tangible asset; and
triggering a payment in response to detecting the modification.

15. The method of claim 14, further comprising validating, in collaboration with a plurality of nodes of a blockchain network, the modification of the one of the ownership or the location prior to recording a change in a block of a blockchain in the blockchain network.

16. The method of claim 9, wherein at least one of the first tangible asset, the second tangible asset, or the third tangible asset is one of a machine or a parcel of land.

17. A non-transitory, processor-readable storage medium storing instructions for information storage and retrieval using an off-chain database and a distributed ledger to cause a processor to:
cause storage, in the distributed ledger, of a first hash value representing a first off-chain storage location of an off-chain database in which a root node of a first hierarchical hash-linked tree data structure is stored, the first hash value associated with a state of a smart contract that includes a second hash value of the root node of the first hierarchical hash-linked tree data structure, the state of the smart contract representing a snapshot of data stored in the first smart contract, the first hierarchical hash-linked tree data structure representing tangible asset data for a first tangible asset, the off-chain database not including a copy of any block within the distributed ledger;
store, in the off-chain database and at a second off-chain storage location, a second hierarchical hash-linked tree data structure representing tangible asset data for a second tangible asset; and
store, in the off-chain database, a third hierarchical hash-linkedtree data structure representing tangible asset data of a third tangible asset, in response to a combining of the first tangible asset and the second tangible asset to produce the third tangible asset.

18. The non-transitory processor-readable medium of claim 17, wherein each of the tangible asset data of the first tangible asset, the tangible asset data of the second tangible asset, and the tangible asset data of the third tangible asset, includes at least one of a color, a physical size, a quantity, a make, a model, or assay information.

19. The non-transitory processor-readable medium of claim 17, wherein at least one of the first tangible asset, the second tangible asset, or the third tangible asset is one of a machine or a parcel of land.

20. The non-transitory processor-readable medium of claim 17, further storing instructions to cause the processor to:
detect a modification of one of a ownership or a location of the third tangible asset; and
triggering a payment in response to detecting the modification.

* * * * *

UNITED STATES PATENT AND TRADEMARK OFFICE
CERTIFICATE OF CORRECTION

PATENT NO. : 11,921,705 B2
APPLICATION NO. : 17/566954
DATED : March 5, 2024
INVENTOR(S) : Paul Richard Brody et al.

Page 1 of 1

It is certified that error appears in the above-identified patent and that said Letters Patent is hereby corrected as shown below:

In the Specification

Column 18, Line 20: "ations-in-part, divisional s, and/or the like thereof. As such," should read
-- ations-in-part, divisionals, and/or the like thereof. As such, --

In the Claims

Column 20, Line 8 (Claim 1, Line 12): "hierarchical hash-linked data structure representing" should
read -- hierarchical hash-linked tree data structure representing --

Column 22, Line 36 (Claim 17, Line 23): "linkedtree data structure representing tangible asset" should
read -- linked tree data structure representing tangible asset --

Signed and Sealed this
Ninth Day of April, 2024

Katherine Kelly Vidal
*Director of the United States Patent and Trademark Office*